July 14, 1964     E. J. COTILLA ETAL     3,140,886
COUPLING DEVICE
Filed May 14, 1963
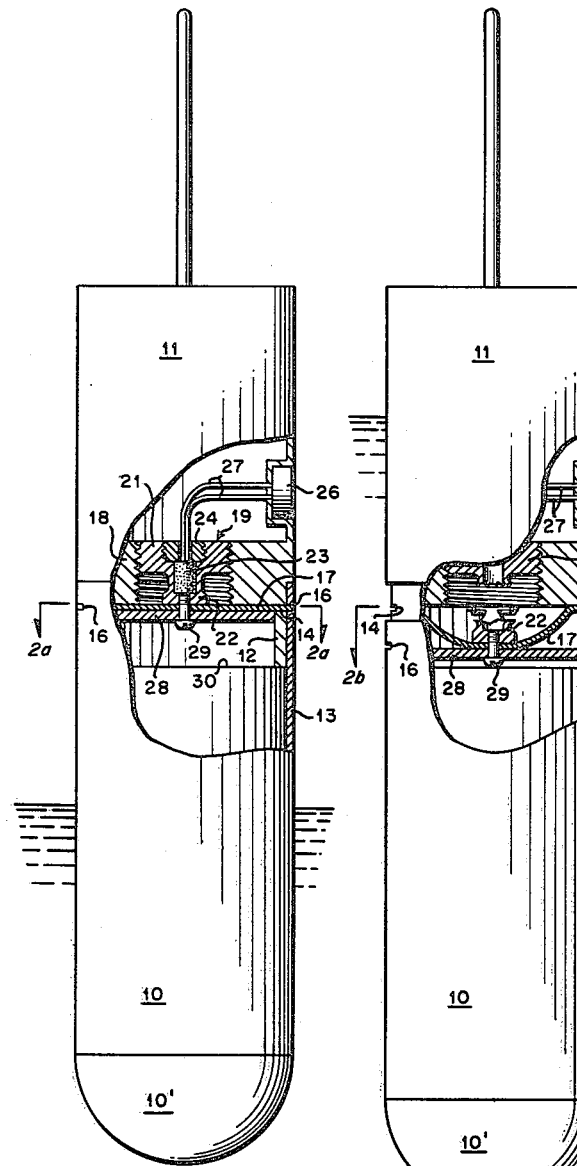
Fig. 1a
Fig. 1b
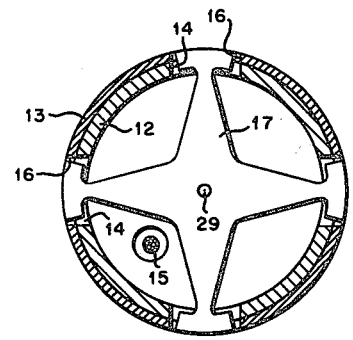
Fig. 2a
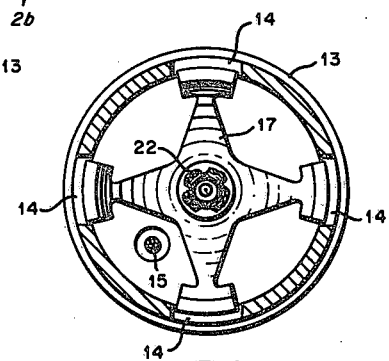
Fig. 2b
INVENTORS
EDWARD J. COTILLA
GEORGE A. GIMBER
BY
ATTORNEY

United States Patent Office 3,140,886
Patented July 14, 1964

3,140,886
COUPLING DEVICE
Edward J. Cotilla, Oakford, and George A. Gimber, Hatboro, Pa., assignors to the United States of America as represented by the Secretary of the Navy
Filed May 14, 1963, Ser. No. 280,474
4 Claims. (Cl. 287—119)
(Granted under Title 35, U.S. Code (1952), sec. 266)

The invention disclosed herein may be manufactured and used by or for the Government of the United States of America for governmental purposes without the payment of any royalties thereon or therefor.

The present invention relates to coupling devices and more particularly to a coupling device for securing and automatically separating adjoining sections of an object to each other.

Objects are sometimes divided into separate and distinct sections so that they may be assembled and separated as desired. For example, it is usually desirable to jettison a rocket motor from its payload after burnout. Another example, which is of primary concern in air-launched sonobuoy design, is where two tandem-connected cylindrical sections of the sonobuoy's ballistic casing are to be separated after immersion in the sea to form thereby an operational transmitter buoy and depending hydrophone combination. The manner in which the cylindrical sections are secured to each other becomes critical in air-launchings from high performance aircraft. A streamlined profile during free flight is essential to placement accuracy of the sonobuoy. Any abrupt protuberances on the ballistic casing will obviously introduce unstable flight. To achieve a smooth ballistic profile while still maintaining securing and releasing reliability of the adjoining sections usually entails numerous interconnecting elements, much tooling and expensive manufacturing methods. For example, prior art devices require close machining tolerances, and substantial cylinder wall thickness where the cylindrical sections are joined. Also, the number of connecting elements required would render assembly of the cylinders difficult. In some applications, it was absolutely necessary that the two cylindrical sections, upon being decoupled, be forced apart by a separate force-exerting means in addition to the elements needed to hold the sections together.

Accordingly, it is an object of the present invention to provide a coupling device for securing two adjoining sections of an object to each other forming thereby a smooth, uninterrupted connection in which the elements comprising the coupling device are fully contained within the outer periphery of the joined sections and which affords positive separation of the sections following automatic decoupling action.

Another object of the invention is to provide a coupling device for automatically decoupling two tandem-connected sections of a ballistic casing in which the device is unaffected by acceleration or vibration.

A further object of the invention is to provide a coupling device for securing one cylindrical float section of an air-launched sonobuoy to another section and releasing said sections when the sonobuoy becomes immersed in sea water.

Still another object of the invention is to provide a coupling means comprising a minimum of parts, which is inexpensive to manufacture and simple to assemble, and which is sturdy and reliable at high acceleration and impact load factors.

Various other objects and advantages will appear from the following description of one embodiment of the invention, and the most novel features will be particularly pointed out hereinafter in connection with the appended claims.

In the drawing:
FIGS. 1a and 1b represent longitudinal views of an air-launched sonobuoy in the coupled and decoupled positions, respectively, fragmentary cross sections at the diameter being shown at the coupling device; and
FIGS. 2a and 2b represent transverse cross sectional views of the sonobuoy in FIGS. 1a and 1b taken along the lines 2a—2a and 2b—2b, respectively.

The illustrated embodiment of the coupling device of the present invention is shown in the environment of an air-launched sonobuoy having an outer casing of ballistic configuration for aerodynamic stability for air launching. After water immersion, the outer casing separates to form a radio buoy and a hydrophone depending therefrom by a long cable. Of course, it will become apparent from the following description that the invention can be utilized in many other environments where is is desired to provide selective coupling of two adjoining elements.

Referring to FIG. 1a, the sonobuoy is shown as comprising two equidiameter, coaxial cylindrical casings 10 and 11 coupled in tandem at the confronting ends thereof for the hydrophone and buoy, respectively. The confronting end of the buoy casing 11 is of reduced diameter for a short distance along the length thereof forming thereby a cylindrical insert 12. The confronting end of the hydrophone casing 10 is recessed to form a cylindrical lip 13 internally proportioned to slidably receive the insert 12 for its full length whereby the confronting ends of the casings 10 and 11 interfit to form a single, uninterrupted cylindrical configuration. A removable nose member 10' secured on the other end of the hydrophone casing 10 completes the configuration for ballistic stability.

As best seen in FIG. 2a, the insert 12 and the lip 13 each include four radial slots 14 and 16, respectively, spaced equally about their circumferences. Each group of four slots is positioned in a single plane normal to its cylindrical axis. The location of the slots 14 is coplanar with the slots 16 when the insert 12 is fully contained within the recess 13, and the casings 10 and 11 are rotated into an orientation about their longitudinal axes so that the slots 14 register with the slots 16 forming thereby four radial openings communicating between the inside and outside of the casings. The slots 14 and 16 are maintained in registration by the ends of a cross-shaped leaf spring 17 which is urged from a relaxed concave configuration, as viewed from the casing 11, into a flat configuration in a manner now to be described.

The insert 12 of the buoy casing 11 also includes a cylindrical recess the depth along the cylindrical axis being less than the length of the insert 12 and is partitioned from the interior of the buoy casing 11 by a bulkhead 18. An explosive bolt assembly, indicated generally by the numeral 19, is coaxial with the casing 11 and threadingly secures to the bulkhead 18 along an enlarged thread portion 21. The bolt assembly 19 further includes a reduced-diameter boss 22 terminating at its outer face in the same plane as formed by the outer surface of the bulkhead 18. An electrically detonated explosive charge 23 is contained within the bolt 19 by a grommet nut 24, at least a portion of the charge extending into the boss 22. The charge 23 is fired by a current generated in a sea water activated battery 26 electrically connected by wires 27 passing through the casing 11 and the nut 24. The battery 26 is imbedded in the side of buoy casing 11 with an exposed surface curved to smoothly conform with the surface of the cylindrical casing 11.

As noted previously, when the spring 17 is relaxed to its unstressed condition, the crossarms take a concave configuration in which each crossarm is arched inward toward the buoy casing 11. This is shown in FIG. 1b. A rigid disc 28 adjacent to the convex side of the spring 17 is contained in abutting relation by a set screw 29 passing through the centers of both the spring 17 and disc 28 and threadingly securing to the boss 22 along the cylindrical axis thereof at the outer surface. As shown in FIG. 1a, when the screw 29 is fully turned into the boss 22, the spring 17 is urged into the flat configuration between the bulkhead 18 and the disc 28 so that the ends of the crossarms slidably extend through the slots 14 and into the registering slots 16 of the casings 11 and 10, respectively.

The cross-sectional area of the boss 22 is critical to the extent that, upon explosion of the charge 23, the boss 22 will completely rupture and sever its outer surface from the enlarged portion 21 of the boss 19 thereby releasing the force of the disc 28 against the convex side of the spring 17. The crossarms of the spring 17 thus relax to the arched configuration retracting their ends out of the slots 14 and 16 to free the two casings 10 and 11. The force of the spring 17, in a partially relaxed position can also be imparted between the bulkhead 18 and an opposing surface 30 in the casing 10 to provide additional positive separation.

The operation of the coupling device should now be apparent. The two casings 10 and 11 are originally connected together by aligning the slots 14 and 16 and then securing the screw 29 to the boss 22, such as with a long screwdriver inserted in the forward end of the hydrophone casing 10 before the payload and nose 10' are secured thereto. The sonobuoy thus obtains a smooth aerodynamic configuration. Upon immersion in sea water, the battery 26 is activated and generates an electrical current sufficient to detonate the explosive charge 23 in the bolt assembly 19. The boss 22 ruptures due to its relatively weak area about the charge 23 and completely severs the connection at the screw 29 from the secured enlarged portion 21. The explosive force causes the disc 28 to move outward from the recess formed in the casing 11 and permits the spring 17 to relax and withdraw from the slots 14 and 16 thereby decoupling the two casings 10 and 11. The explosive force from the charge 23 may aid in propelling casings 10 and 11 completely apart as well as the spring 17, however, additional springs may be conveniently added between the two casings to augment further the separation force for positive separation. FIG. 1b represents decoupling by the spring 17 just prior to complete separation of the two casings 10 and 11.

Obviously, the inventive concept is not limited to use in sonobuoys but may be adapted to any apparatus wherein the connection of two containers of any cross-sectional configuration is desired. Moreover, it is not limited to the specific actuation of a sea-activated battery cell. For example, the coupling device of the present invention is suitable for decoupling rocket stages in accordance with a time schedule.

It will be further understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A coupling device for securing two adjoining sections of an object to each other, the sections having interfitting ends with peripheral slots disposed around the peripheries thereof and registering with each other comprising:
   an explosive bolt assembly adapted to be secured to the one section at the interfitting end and including a boss and an explosive charge therein;
   a leaf spring having a plurality of peripheral arms normally arched toward the one section and aligned for the arms to slide into said registered slots when flattened against the one section;
   a rigid element disposed on the side of said spring opposite from the one section for distributing a force against said spring;
   a set screw passing through said rigid element and said spring and secured to said boss for maintaining said spring in a flat configuration; and
   electrical means contained within the one section and connected to said charge for detonating the charge.

2. A coupling device for securing two adjoining sections of an object to each other, comprising:
   an insert element adapted to extend from one of the sections and forming a recess therein, said insert forming a first plurality of coplanar slots around the periphery thereof;
   a recess element adapted to extend from the other of the sections for slidably receiving said insert element, said recess element forming a second plurality of coplanar slots positioned to register with said first slots when said insert element is fully contained within said recess element;
   an explosive bolt assembly adapted to be secured to the one section and including a boss and an explosive charge therein;
   a leaf spring having a plurality of peripheral arms normally arched toward the one section and aligned for the arms to slide into said registered slots when flattened against the one section;
   a rigid element disposed on the side of said spring opposite from the one section for distributing a force against said spring;
   a set screw passing through said rigid element and said spring and secured to said boss for maintaining said spring in a flat configuration; and
   electrical means contained within the one section and connected to said charge for detonating the charge; whereby the force generated by the exploded charge produces complete severance of the boss from the remainder of said bolt assembly and permits said spring to withdraw from said slots and separate the section.

3. A coupling device for securing two adjoining sections of an object to each other, comprising:
   a cylindrical insert element adapted to extend from one of the sections and forming a cylindrical recess therein, said insert forming a first plurality of coplanar slots around the periphery thereof;
   a cylindrical recess element adapted to extend from the other of the sections for coaxially and slidably receiving said insert element, said recess element forming a second plurality of coplanar slots positioned to register with said first slots when said insert element is fully contained within said recess element;
   an explosive bolt assembly adapted to be secured to the one section and including a boss and an explosive charge therein;
   a leaf spring having a plurality of radial arms normally arched toward the one section and aligned for the arms to slide into said registered slots when flattened against the one section;
   a flat rigid disc disposed on the side of said spring opposite from the one section for distributing a force against said spring;
   a set screw passing through said disc and said spring and secured to said boss for maintaining said spring in a flat configuration; and
   electrical means contained within the one section and connected to said charge for detonating the charge; whereby the force generated by the exploded charge produces complete severance of the boss from the remainder of said bolt assembly and permits said spring to withdraw from said slots and separate the sections.

4. Coupling apparatus comprising, in combination:
   a first hollow cylinder having a reduced outside diameter at one end and forming therethrough a first plurality of coplanar slots around the periphery near said one end;

a second hollow cylinder of substantially the same diameter as said first cylinder, one end thereof adapted to receive said one end of said first cylinder and forming therethrough a second plurality of coplanar slots around the periphery near said one end of said second cylinder, said slots positioned to register with said first slots when said cylinder ends are interfitted;

an explosive bolt assembly secured to said one end of said first cylinder and including a boss and an explosive charge therein;

a leaf spring having a plurality of radial arms normally arched toward said first cylinder and rotationally oriented for the arms to slide into said registering slots when said spring is flattened against said first cylinder;

a flat rigid disc disposed on the side of said spring opposite from said first cylinder for distributing a force against said spring;

a set screw passing through said disc and said spring and secured to said boss for maintaining said spring in a flat configuration; and electrical means contained within said first cylinder and connected to said charge for detonating the latter;

whereby the force generated by the exploded charge produces complete severance of the boss from the remainder of said bolt assembly and permits said spring to withdraw from said slots and separate the cylinders.

References Cited in the file of this patent

UNITED STATES PATENTS

| | | |
|---|---|---|
| 2,541,144 | Anderson | Feb. 13, 1951 |
| 2,871,750 | Parrish | Feb. 3, 1959 |
| 2,949,822 | Musser | Aug. 23, 1960 |
| 3,071,404 | Van Hove | Jan. 1, 1963 |